(12) United States Patent
Mori et al.

(10) Patent No.: US 9,115,527 B2
(45) Date of Patent: Aug. 25, 2015

(54) CONTROL DEVICE AT OPENING/CLOSING SECTION OF VEHICLE AND METHOD FOR CONTROLLING OPENING/CLOSING SECTION OF VEHICLE

(71) Applicants: RiB Laboratory, Inc., Shiga (JP); HONDA MOTOR CO., LTD., Tokyo (JP)

(72) Inventors: Setsuro Mori, Shiga (JP); Tsuyoshi Eguchi, Saitama (JP); Toshikazu Karube, Saitama (JP)

(73) Assignees: RIB LABORATORY, INC., Shiga (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/823,789

(22) PCT Filed: Oct. 16, 2012

(86) PCT No.: PCT/JP2012/076694
§ 371 (c)(1),
(2) Date: Apr. 11, 2013

(87) PCT Pub. No.: WO2013/121623
PCT Pub. Date: Aug. 22, 2013

(65) Prior Publication Data
US 2014/0109478 A1    Apr. 24, 2014

(30) Foreign Application Priority Data

Feb. 15, 2012 (JP) ................. 2012-030196

(51) Int. Cl.
*E05F 15/40* (2015.01)
*E05F 15/00* (2015.01)
(Continued)

(52) U.S. Cl.
CPC ............. *E05F 15/0017* (2013.01); *B60J 5/00* (2013.01); *E05F 15/40* (2015.01); *E05F 15/41* (2015.01);
(Continued)

(58) Field of Classification Search
USPC ........ 49/26, 28, 324, 348, 349, 360; 318/602, 318/280, 282, 283, 286, 445, 466, 468
See application file for complete search history.

(56) References Cited

U.S. PATENT DOCUMENTS 3,549,045 A * 12/1970 Rosenhagen ................. 221/12
3,605,909 A *  9/1971 Lemelson ...................... 173/3
(Continued)

FOREIGN PATENT DOCUMENTS

| JP | 2006-207300 | 8/2006 |
|---|---|---|
| JP | 2007-126960 | 5/2007 |
| JP | 2009-142122 | 6/2009 |

OTHER PUBLICATIONS

Extended European Search Report issued Mar. 19, 2015 in corresponding European Patent Application No. 12830876.4.

*Primary Examiner* — Katherine Mitchell
*Assistant Examiner* — Catherine A Kelly
(74) *Attorney, Agent, or Firm* — Wenderoth, Lind & Ponack, L.L.P.

(57) ABSTRACT

A control device at an opening/closing section of a vehicle and a method for controlling the opening/closing section of the vehicle control a motor so that a pinch at the opening/closing section is determined accurately. The control device includes a pinch determination device that is mounted to the motor for opening/closing the opening/closing section of the vehicle and determines a pinch of a foreign object based on a change in the rotation number of the motor, and demagnetization pulse applying device for supplying power with reverse polarity to the motor in a pulse-like manner at the completion of the opening/closing.

7 Claims, 6 Drawing Sheets

(51) Int. Cl.
  *B60J 5/00* (2006.01)
  *E05F 15/41* (2015.01)
  *E05F 15/695* (2015.01)
  *E05F 11/48* (2006.01)

(52) U.S. Cl.
  CPC ............ *E05F 15/695* (2015.01); *E05F 11/486* (2013.01); *E05Y 2201/438* (2013.01); *E05Y 2201/462* (2013.01); *E05Y 2400/52* (2013.01); *E05Y 2400/564* (2013.01); *E05Y 2800/40* (2013.01); *E05Y 2800/41* (2013.01); *E05Y 2900/55* (2013.01)

(56) References Cited

U.S. PATENT DOCUMENTS

| | | | |
|---|---|---|---|
| 4,258,997 A * | 3/1981 | Fukahori et al. | 396/406 |
| 4,902,944 A * | 2/1990 | Daggett et al. | 318/568.11 |
| 4,912,692 A * | 3/1990 | Kamens | 368/157 |
| 4,980,838 A * | 12/1990 | Daggett et al. | 318/568.16 |
| 4,986,919 A * | 1/1991 | Allington | 210/656 |
| 5,925,997 A | 7/1999 | Yamaoka | |
| 6,339,306 B1 * | 1/2002 | Hara | 318/696 |
| 6,426,604 B1 * | 7/2002 | Ito et al. | 318/466 |
| 6,999,381 B2 * | 2/2006 | Fujisawa et al. | 368/47 |
| 7,021,001 B1 * | 4/2006 | Schooler | 49/28 |
| 7,283,428 B2 * | 10/2007 | Ogasawara | 368/157 |
| 7,521,883 B1 * | 4/2009 | Otsuka et al. | 318/254.1 |
| 7,690,152 B2 * | 4/2010 | Kobayashi et al. | 49/28 |
| 7,830,107 B2 * | 11/2010 | Inoue et al. | 318/470 |
| 8,248,018 B2 * | 8/2012 | Maekawa et al. | 318/701 |
| 8,457,831 B2 * | 6/2013 | Oakley et al. | 49/26 |
| 2006/0168891 A1 * | 8/2006 | Aoyama et al. | 49/360 |
| 2007/0079556 A1 * | 4/2007 | Oberheide | 49/324 |
| 2008/0110092 A1 | 5/2008 | Takahashi | |
| 2012/0016550 A1 * | 1/2012 | Oakley et al. | 701/29 |

* cited by examiner

CONTROL DEVICE AT OPENING/CLOSING SECTION OF VEHICLE AND METHOD FOR CONTROLLING OPENING/CLOSING SECTION OF VEHICLE

TECHNICAL FIELD

The present invention relates to a control device at an opening/closing section (i.e., an opening and closing section) of a vehicle and a method for controlling the opening/closing section of the vehicle.

BACKGROUND ART

As control devices at opening/closing sections for opening/closing windows that are opening/closing sections of vehicles, electric window devices are put to practical use. Further, safety devices are invented and are put to practical use so that, while the window is being closed by the electric window device, exertion of a great power is prevented due to the possibility of pinching a foreign object such as a body. Patent Document 1 (Japanese Patent Application Laid-Open No. 2007-126960) describes that a variation of a rotating speed is calculated based on a current value and a past value of a motor rotating speed, and a pinch is detected by using the variation.

FIG. 9 is a diagram describing a constitution of a conventional electric window device 90. The electric window device is constituted by connecting an operation switch 93, a motor driving circuit 94, motors for respective windows 95 . . . , rotary encoders 96 . . . , load sensors 97 . . . , temperature sensors 98 . . . and acceleration sensors 99 . . . to an electric window control section 92 connected to a battery 91 of a vehicle. 100 is a power steering control section.

The electric window control section 92 outputs a signal to the motor driving circuit 94 so that power is supplied to the motor 95 provided to a window specified by input of the operation switch 93, and the motor driving circuit 94 supplies power to the motor 95. At this time, the rotary encoders 96 rotate, and the electric window control section 92 inputs the signal from the rotary encoder 96 so as to obtain a rotating speed of the motor 95 and calculates a displacement of the window opened/closed by the motor 95, and performs feedback control. In addition, in the case where the occurrence of a pinch is detected by comparing past rotating speeds and rotating positions of the motor 95 that are preliminarily stored, for example, the motor 95 is reversely rotated so that danger can be avoided.

PRIOR ART DOCUMENT

Patent Document

Patent Document 1: Japanese Patent Application Laid-Open No. 2007-126960

SUMMARY OF THE INVENTION

Problems to be Solved by the Invention

However, magnetization occurs in rotor portions of the motors 95 due to large currents at a time of torque generation, and this occasionally causes abrupt rotation at a time of activation after reversal of a driving direction. The abrupt rotation soon returns to a normal rotating speed, but when a pinch is determined based on a change in the rotating speed of the motor 95, the abrupt change in the rotating speed might be determined as a pinch, thereby causing problematic false operation.

In order to prevent the abrupt change in speed from being determined as a pinch, solution methods are considered, such as the provision of a sensor for detecting a magnetization state of the rotor and a learning function for performing a complicated arithmetic process so as to monitor behaviors. These methods, however, raise not only the manufacturing cost, but also require an arithmetic processing unit with higher-performance since the more complicated arithmetic process is, the greater load exerted on an arithmetic processing unit for detecting a pinch becomes. These problems also degrade reliability and heighten the dangers of the occurrence of false operation.

The present invention is devised in view of the above matter, and an object thereof is to provide a control device at an opening/closing section of a vehicle and a method for controlling the opening/closing section of the vehicle for controlling a motor so that a pinch at the opening/closing section is determined accurately while its constitution is very simple.

Means for Solving the Problem

In order to solve the above problems, a first invention provides a control device at an opening/closing section of a vehicle including a pinch determination device that is mounted to a motor for opening/closing an opening/closing section of a vehicle and determines a pinch of a foreign object based on a change in the rotation number of the motor, and demagnetization pulse applying means for supplying power with reverse polarity to motor in a pulse-like manner at completion of the opening/closing.

When power is supplied to the motor, the opening/closing section moves to an opening or closing direction according to its polarity, but the pinch determination device monitors the rotation number of the motor and determines a pinch of a foreign object based on its change. Further, when an electric current flows in the motor, its rotor becomes an electric magnet so that the motor rotates, but magnetization occasionally occurs in the rotor particularly at the completion of the opening/closing. When magnetization occurs in the rotor, a rotation torque increases at next start of driving of the motor in a reverse direction and the rotating speed is occasionally heightened for a moment, but the demagnetization pulse applying means applies power with reverse polarity to the motor in the pulse-like manner at the completion of the opening/closing, so that the rotor can be demagnetized even if the rotor is magnetized. Therefore, the motor whose rotor is demagnetized does not abruptly operate at the activation time, and the pinch determination device does not falsely operate.

The demagnetization pulse applying means can be simply formed by hardware that uses an edge circuit or a one-shot circuit where a simple timer circuit and relay circuit are combined for monitoring power to be supplied to the motor using an edge at completion of power supply as a trigger. An occurrence condition of the magnetization varies according to characteristics of the motors, but when a pulse with reverse polarity to be applied by the demagnetization pulse applying means (hereinafter, a demagnetization pulse) is adjusted according to the characteristic of the motor, the pinch determination device does not perform a false operation caused by magnetization of the rotor. However, the demagnetization pulse applying means may be implemented by executing a program for applying a demagnetization pulse at completion of a driving signal to the motor (hereinafter, a demagnetizing process) in the arithmetic processing unit in an ECU. In this case, the arithmetic processing unit that executes the demagnetizing process is the demagnetization pulse applying means, but since the demagnetizing process can be implemented by a very simple subroutine program, load is not put on the arithmetic processing unit and the manufacturing cost does not rise.

It is to be noted that the demagnetization pulse applying means may be provided with magnetic susceptibility estimating means for monitoring an electric current flowing in the motor so as to estimate magnetic susceptibility of the rotor, and demagnetization pulse width adjusting means for adjusting a width of a demagnetization pulse according to the magnetic susceptibility, so as to perform demagnetization according to the magnetization state of the rotor. Further, as the width of a demagnetization pulse, a pulse width that prevents the opening/closing section from moving is the upper limit. Further, the pulse applying means may apply a demagnetization pulse with reverse polarity that is lower than a voltage for driving the opening/closing section. That is to say, the opening/closing section may be avoided from moving to an opposite direction due to a demagnetization pulse by providing a switch circuit for applying a demagnetization pulse with reverse polarity, where a resistive element is interposed between the motor and power supply. It is considered that an apply voltage of a demagnetization pulse is regulated by a software process. In both the cases, the control device at the opening/closing section of the vehicle is simple because of a simple constitution where a regulated demagnetization pulse is generated, and a determination as to a pinch of a foreign object is not complicated unlike the case where a pinch is determined with the magnetization state being taken into consideration.

The opening/closing section in the present specification may be not only a glass window provided to a side surface of the vehicle but also a roof window provided to a roof portion of the vehicle or a rear window, a slide door provided to the side portion of the vehicle, or a tail gate or a trunk room provided to a rear portion of the vehicle.

It is preferable that the pinch determination device for determining a pinch of a foreign object based on the change in the rotation number of the motor includes a time counting section for counting relative time adjusted according to a fluctuation in power supply voltage, and obtains a moving speed of the opening/closing section as a relative speed from the change in the rotation number of the motor based on the relative time, calculates a relative speed change where an influence of a decrease in the rotating speed of the motor associated with a decrease in power supply voltage is cancelled based on the relative speed change, and compares the relative speed change (relative acceleration) with a relative acceleration threshold so as to determine a pinch.

In the case where a pinch is determined by using a relative speed obtained on a time axis adjusted according to a power supply voltage, even when the rotating speed of the rotating motor fluctuates within the relative time in association with a voltage fluctuation of the power supply and this fluctuation is caused by a lactation in power supply voltage, the relative speed does not change. For this reason, a definite threshold is set unconditionally by the relative speed change without executing a complicated arithmetic process so that the pinch can be determined. Therefore, when a pinch occurs regardless of a level of the power supply voltage, the pinch can be determined with little impact being exerted on a pinched body and the like.

It is preferable that a length of the relative time that is adjusted with respect to the voltage fluctuation is finely adjusted according to a characteristic of the motor, but as the power supply voltage is lower in any DC motors, the rotating speed is lower. For this reason, much individual difference is not seen, and the length of the relative time may be adjusted in an approximately linear manner with respect to the power supply voltage. An output P from the motor, a relative speed Vt of a movable portion and a mass m of the movable portion establish a relationship: $P=mVt2$, and since it is considered that an impact that is put on a user at a time of pinch is proportional to the output P from the motor, the relative time is preferably adjusted so that a square of the relative speed Vt becomes constant.

A reverse rotation section for reversely driving the opening/closing section when the pinch determination device determines that a foreign object is pinched is provided. In the case where the demagnetization pulse applying means supplies power to the motor through the reverse rotation section, since a direction of power with reverse polarity to be applied to the motor in order to prevent false detection of a pinch is an opposite direction (opening direction) to a driving direction (normally, the closing direction) of the opening/closing section where pinch is detected, when the pinch is detected, it is the same as a direction for driving the opening/closing section (normally, the direction where the opening/closing section is opened). For this reason, the reverse rotation section can be shared, so that the constitution can be simplified.

A first timer for counting a first predetermined time from a time at which the pinch determination device determines that a foreign object is pinched, and a second timer for counting a second predetermined time from a time at which the power supply to the motor is completed are provided. In the case where the reverse rotation section supplies power to the motor while the first timer or the second timer counts a time, the amount of the power supplied from the reverse rotation section can be controlled according to a measured time of the timer, thereby simplifying the constitution.

In the case where the second predetermined time is set to a time at which the opening/closing section does not move even if power is supplied from the reverse rotation section to the motor, power to be applied in a pulse-like manner can be adjusted to a level at which the opening/closing section does not move by setting the second predetermined time, thereby making the setting easy.

A second invention provides a control device at an opening/closing section of a vehicle including a pinch determination device that is mounted to a motor for opening/closing a window of the vehicle and determines a pinch of a foreign object based on a change in a rotation number of the motor for driving to a closing direction, and demagnetization pulse applying means for supplying power whose polarity closes the window at a time when driving of the window to the opening direction through the motor is completed to the motor so that its pulse width prevents the window to from moving.

In the control device at the opening/closing section of the vehicle in the second invention, when a pinch at a window as the opening/closing section of the vehicle is determined, power whose polarity closes the window as a demagnetization pulse is supplied to the motor only at the time of the completion of the driving of the window to the opening direction. This is because since the window pinch determination is made only at the time of driving the window to the closing direction, even when magnetization occurs in the rotor at the time of the completion of the window closing operation, on the next occasion of the window being opened, the pinch determination is not made. Therefore, since a demagnetization pulse cannot be applied to the window closing direction, accordingly the operation is simplified, thereby improving reliability.

When a demagnetization pulse whose polarity closes the window is applied, power is supplied against a load of the window, and thus the window hardly rise due to the demagnetization pulse, thereby performing sufficient demagnetization. Therefore, the motor whose rotor is demagnetized does not abruptly operate when the window is driven to the closing direction next time.

The demagnetization pulse applying means can be simply formed by hardware using an edge circuit or a one-shot circuit where a timer circuit and a relay circuit are combined, and the pinch determination device does not falsely operate due to magnetization of the rotor regardless of a characteristic of the motor. However, the demagnetization pulse applying means is implemented by software (program), so that the manufacturing cost may be further reduced.

The pulse applying means may include the magnetic susceptibility estimating means and demagnetization pulse width adjusting means so as to perform demagnetization according to the magnetization state of the rotor. Further, the pulse applying means may apply a demagnetization pulse of the reverse polarity that is lower than a voltage for driving the opening/closing section. Further, it is considered that an apply voltage of a demagnetization pulse is adjusted by software processing.

The pinch determination device for determining a pinch of a foreign object based on a change in the rotation number of the motor preferably includes a time counting section for counting a relative time adjusted according to a fluctuation in power supply voltage, obtains a moving speed of the opening/closing section from the change in the rotation number of the motor based on the relative time as a relative speed, calculates a change in the relative speed where an influence of a reduction in the rotating speed of the motor associated with a reduction in power supply voltage is cancelled based on the change in relative speed, and compares the relative speed change (relative acceleration) with a relative acceleration threshold so as to determine the occurrence of a pinch.

A third invention provides a method for controlling an opening/closing section of a vehicle, characterized in that in the pinch determination for determining a pinch of a foreign object based on a change in the rotation number of the motor for opening/closing the opening/closing section of the vehicle, power with reverse polarity is supplied to the motor in a pulse-like manner at a time of the completion of the opening/closing drive.

When power with reverse polarity is supplied as a demagnetization pulse to the motor in a pulse-like manner at the time of the completion of the opening/closing, magnetization of the rotor that might occur at a time of the completion of the driving of the motor can be prevented, and thus abrupt rotation does not occur at a next reverse rotation starting time. The demagnetization pulse can be generated by a circuit in the motor, a circuit provided on a motor side, a circuit in ECU for controlling the driving of the motor, a program executable by the arithmetic processing unit, and a program executable by an upper arithmetic processing unit.

In the case where when power with reverse polarity is supplied to the motor at the time of the completion of the opening/closing, the pinch determination device determines that a foreign object is pinched, and power supply is performed by using the reverse rotation section for reversely driving the motor, a direction of the power with reverse polarity to be applied to the motor in order to prevent false detection of a pinch is a direction (opening direction) opposite to the driving direction (normally, the closing direction) of the opening/closing section where pinch is detected. For this reason, this direction is the same as the direction for driving the opening/closing section when a pinch is detected (normally, the direction where the opening/closing section is opened), and thus the reverse rotation section can be shared, thereby simplifying the constitution.

The first timer counts the first predetermined time after the pinch determination device determines that a foreign object is pinched and the second timer counts the second predetermined time after the time when the power supply to the motor is completed, whereas the reverse rotation section supplies power to the motor while the first timer or the second timer is counting the times. In this case, since the power supply amount from the reverse rotation section can be controlled by the time counted by the timer, the constitution can be simplified.

When the second predetermined time is a time for which the opening/closing section does not move even if the reverse rotation section supplies power to the motor, the setting of the second predetermined time can adjust power to be applied in a pulse-like manner to a level at which the opening/closing section does not move, and thus setting is made to be easy.

A fourth invention provides a method for controlling an opening/closing section of a vehicle, characterized in that in pinch determination for determining a pinch of a foreign object based on a change in the rotation number where a motor for opening/closing a window of the vehicle rotates to the closing direction, power with polarity whose pulse width prevents the window from moving is supplied to the motor at a time of the completion of the driving to the opening direction of the window through the motor.

When the power with reverse polarity is supplied as a demagnetization pulse to the motor in a pulse-like manner at the time when the driving of the window to the opening direction is completed, magnetization of the rotor is prevented, and abrupt rotation does not occur at a time of starting next rotation. The demagnetization pulse can be generated by a circuit in the motor, a circuit provided on a motor side, a circuit in ECU for control for driving the motor, a program executable by the arithmetic processing unit, and a program executable by an upper arithmetic processing unit.

Effect of the Invention

As described above, according to the present invention, when the rotor of the motor for opening/closing the opening/closing section of the vehicle is magnetized, it can be demagnetized, and thus the motor does not perform an abrupt operation when the opening/closing section is driven to be reversely rotated. That is to say, the pinch detection device that determines pinch based on a change in the rotating speed of the motor does not falsely operate so as to perform a stable operation, and can securely detect pinch of a foreign matter.

MODE FOR CARRYING OUT THE INVENTION

Figure 1A:
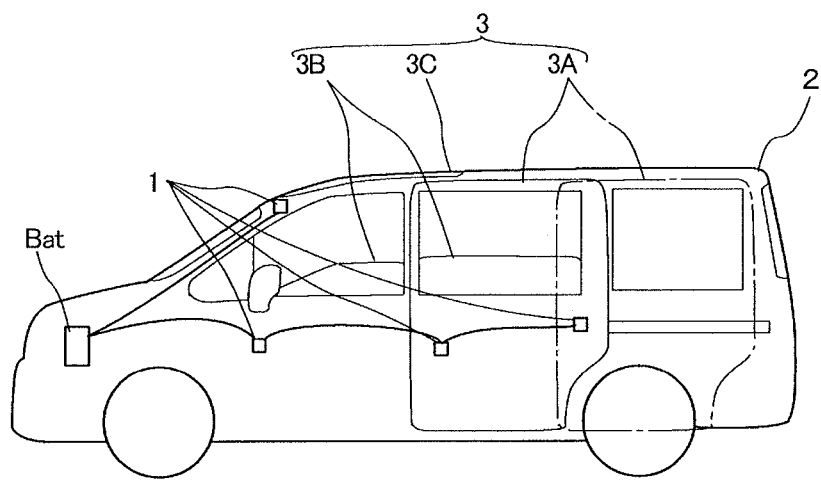
FIGS. 1(A) and 1(B) are diagrams illustrating side and plan views, respectively, of a vehicle to which a control device at an opening/closing section of a vehicle is mounted according to a first embodiment of the present invention.
Figure 1B:
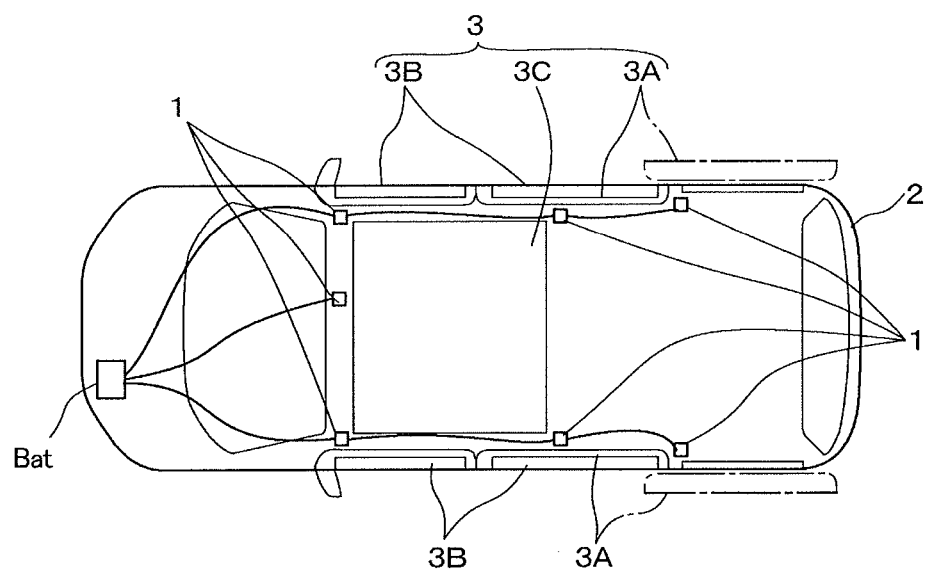

A control device 1 at an opening/closing section (i.e., an opening and closing section) of a vehicle, a vehicle 2 provided with the device, and a method for determining a pinch at the opening/closing section according to a first embodiment of the present invention will be described below with reference to FIG. 1(A) to FIG. 6. FIGS. 1(A) and 1(B) illustrate the vehicle 2 to which the control device 1 at the opening/closing section of the vehicle in the present invention is mounted.

As shown in FIGS. 1(A) and 1(B), slide doors 3A are provided to both side surfaces, respectively, at a rear portion of the vehicle 2, a window 3B is provided to a door on a driver seat side of a front portion, a door on a front passenger seat side and the right and left slide doors 3A at the rear portion and a roof window 3C that can be opened/closed is provided on a roof. Further, these slide doors 3A are constituted so as to shift to a right-left direction, the windows 3B to an up-down direction and the roof window 3C to a front-rear direction, and they are examples of the opening/closing section 3 in the present invention. Bat is a battery of the vehicle, and all electric loads are connected to the battery Bat. Further, the control device 1 at the opening/closing section of the vehicle in the present embodiment is provided to ECUs (Electronic Control Units) for controlling slide doors, controlling electric windows, controlling sun roofs (opening/closing control of sun roof windows), controlling power tail gates (opening/closing control of tail gates), and controlling a power trunk (opening/closing control of trunk room).

The control device 1 at the opening/closing section of the vehicle in the present invention includes a pinch determination device that, when a situation such that a body of a fellow passenger is pinched by the opening/closing section occurs, instantly determines the pinch and moves the opening/closing section 3 to an opposite direction so as to release the pinch. When an activating voltage fluctuates due to a charging amount of the battery Bat and a large current flows into other electric loads, the power supply voltage greatly fluctuates due to internal resistance of the battery Bat and other resistive loss, and the power supply voltage is about 8 to 15 V. For this reason, when the opening/closing sections are opened/closed simultaneously, in some cases, the operating speeds noticeably decrease.

Therefore, the pinch determination device counts a relative time adjusted according to a fluctuation in the power supply voltage, obtains a relative speed of the opening/closing section from the change in the rotation number of the motor based on the relative time, and determines a pinch using the relative acceleration obtained from the change in the relative speed. As a result, a pinch can be determined accurately without an influence of the reduction in the operating speed of the opening/closing section 3 in association with the fluctuation in the power supply voltage. Therefore, in the vehicle 2 provided with the pinch determination device, even if a user's body is mistakenly pinched by the opening/closing section 3, the pinch is determined with less impact, and thus this has a beneficial effect on safety. As a result, the user can use the vehicle 2 at ease.

Figure 2:
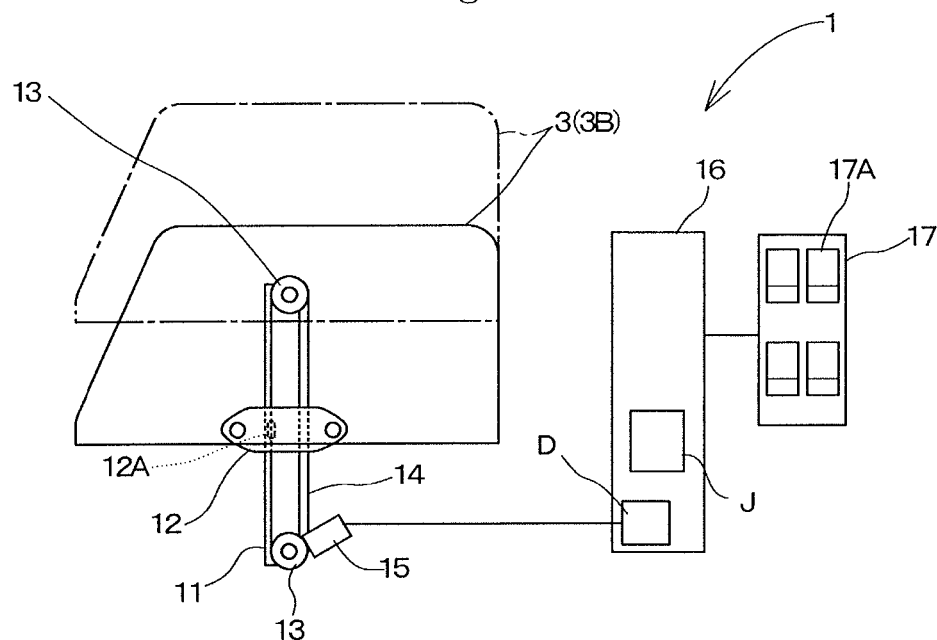
FIG. 2 is a diagram illustrating the control device at the opening/closing section of the vehicle.

FIG. 2 is a diagram illustrating a constitution of the control device 1 (an electric window device) at the opening/closing section of the vehicle having the pinch determination device J. The control device 1 at the opening/closing section of the vehicle is considered to have various constitutions, but in the present embodiment, it has a guide rail 11 fixed to a door with its longitudinal direction being vertical, a sliding body 12 that is movable to an up-down direction along the guide rail 11 and supports a lower end portion of the window 3B, a wire 14 that is wound around pulleys 13 arranged above and below the guide rail 11 and is partially connected to a junction 12A of the sliding body 12, a motor 15 that rotationally moves the wire 14 so as to supply motive power for opening/closing the window 3B, an ECU 16 having an electric window control function for supplying electric power to the motor 15 to regularly and reversely rotates it so as to control opening/closing of the window 3B, and an open/close operation switch 17 for enabling a user's opening/closing operation to be inputted.

The opening/closing operation switch 17 includes four buttons 17A corresponding to the windows 3B . . . , respectively on both right and left sides at front and rear portions, so as to be capable of operating the front, rear, right and left windows 3B . . . separately. For this reason, when an operator simultaneously operates all the buttons 17A, the motors 15 . . . of the windows 3B . . . rotationally move all together, and thus a load to be put on the battery Bat increases. Therefore, the power supply voltage drops and thus the rotating speeds of the motors 15 drop.

Figure 3:
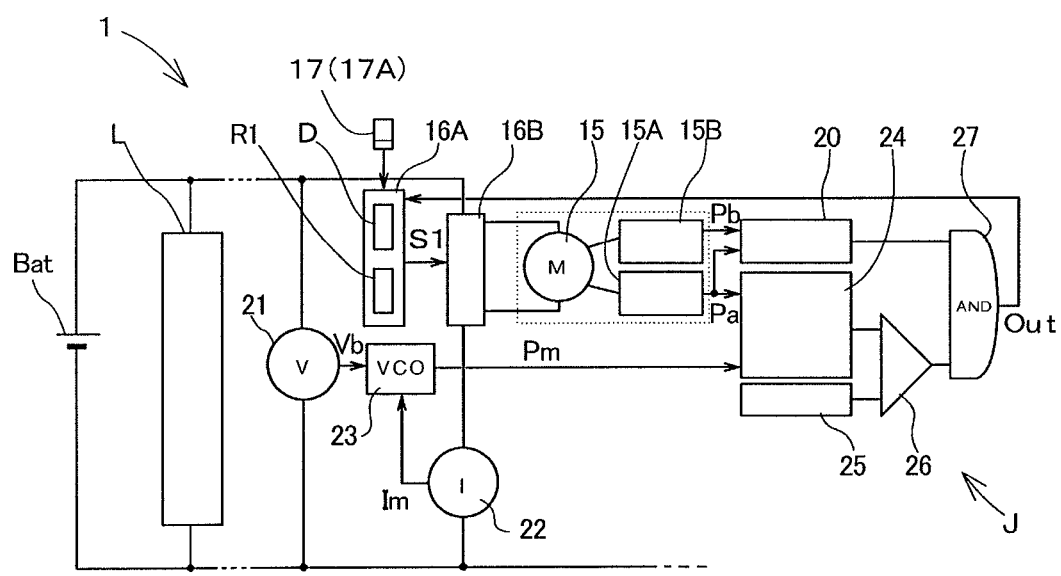
FIG. 3 is a diagram describing the control device at the opening/closing section of the vehicle and a method for controlling the opening/closing section of the vehicle.

FIG. 3 is a block diagram illustrating a circuit configuration of the control device 1 at the opening/closing section of the vehicle according to the present embodiment. The control device 1 at the opening/closing section includes the pinch determination device J, and demagnetization pulse applying means D that is provided on a side of the motor 15 so as to repress magnetization of a rotor in the motor 15. In the present embodiment, the demagnetization pulse applying means D is formed by an electronic circuit (hardware).

The motor 15 includes rotary encoders 15A and 15B as one example of sensors for generating an A-phase pulse Pa and a B-phase pulse Pb whose phases are different from each other by 90° due to its rotation, and outputting a 2-bit gray code so as to detect displacements of the windows 3B. 20 is a direction/position detecting section for detecting rotating directions and rotating angles of the pulses Pa and Pb and positions of the windows 3B based on their integral, 21 is a voltage measuring section for measuring a power supply voltage Vb, 22 is a current measuring section for measuring a motor current Im flowing in the motor, 23 is a VCO (a time counting section) for oscillating a reference pulse Pm whose frequency is lowered according to the drop of the power supply voltage Vb, 24 is a relative acceleration calculating section for measuring a time at which the windows 3B displace minutely based on a leading edge of the A-phase pulse Pa, counting the number of the reference pulses Pm during the time and calculating a relative acceleration based on the change in the relative speed within a minute time Δt using an invert of the counted value as a relative speed Vt of the windows 3B, 25 is a relative acceleration threshold setting section for setting a threshold of the relative acceleration, 26 is a comparison section for comparing the relative acceleration with an acceleration threshold so as to determine a pinch, and 27 is a logic operating section for outputting a pinch determination signal Out when a comparator determines that a pinch occurs and the direction/position detector 20 determines that the windows 3B are not just before closing in the closing direction. Note that L indicates other electric loads.

Therefore, in the present embodiment, 20 to 27 are the pinch determination section J for determining pinch of a foreign matter. The ECU 16 includes a processing section 16A for outputting an opening/closing signal S1 to the window 3B according to the operation of the buttons 17A, and a driver 16B for supplying power to the motor 15 in a direction of control through the opening/closing signal S1. The processing section 16A includes a reverse rotation control section RI for reversely rotating slightly the rotating direction of the motor 15 so as to cancel a pinch state (for driving the window 3B to the opening direction for several hundred msec. to several sec. after the input of the determination signal Out in the present embodiment) when the logic operating section 27 outputs the pinch determination signal Out.

Further, the demagnetization pulse applying means D, that is formed in the processing section 16A, monitors power to be supplied to the motor 15 using an operation input signal of the buttons 17A, generates a demagnetization pulse Pd whose length matches with a characteristic of the motor 15 using an edge at a completion time of the power supply as a trigger, and outputs a demagnetization signal Sd to a driver 16B so that power with reverse polarity is applied to the motor 15 at the completion time of the opening/closing.

Figure 4:
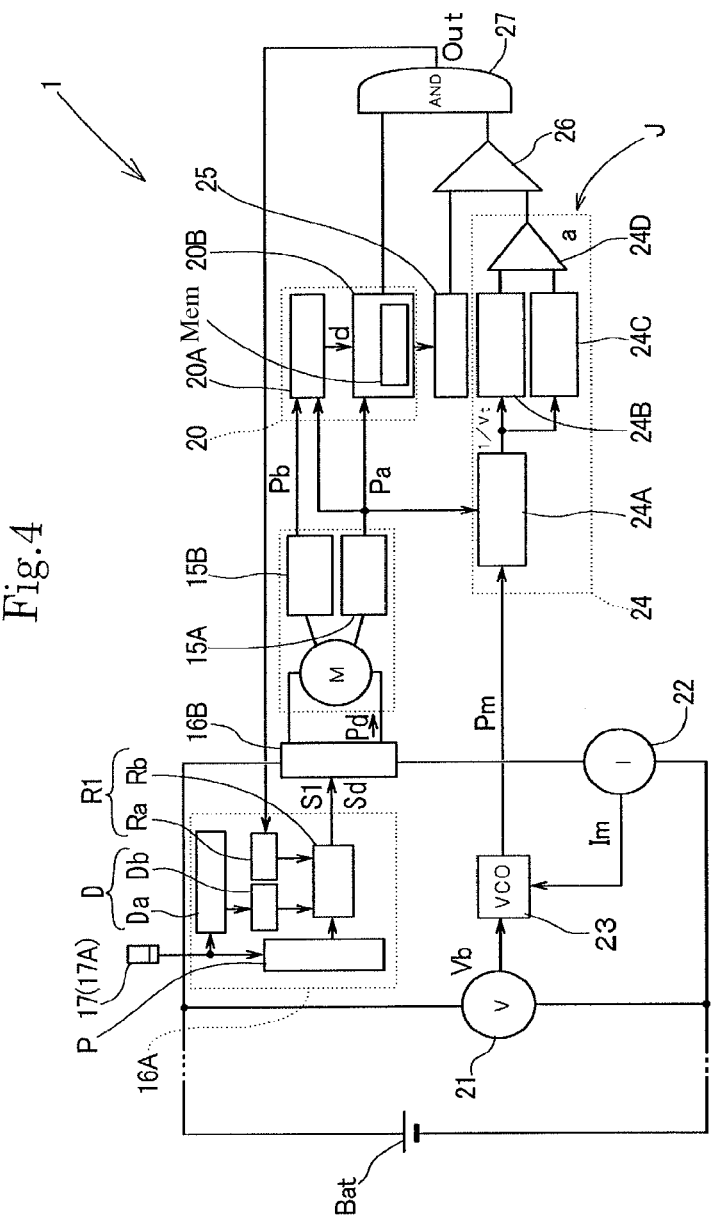
FIG. 4 is a diagram illustrating a more detailed constitution of the control device at the opening/closing section of the vehicle.

FIG. 4 is a diagram describing a more detailed constitution of the control device 1 at the opening/closing section of the vehicle. As shown in FIG. 4, the processing section 16A includes a window control section P for generating a control signal to the opening/closing section according to operations of the buttons 17A, a first timer Ra for counting time of several hundredths to several seconds after the pinch determination signal Out is inputted, so as to count the first predetermined time from a time when the determination is made that a foreign object is pinched, and a reverse rotation section Rb for driving the windows 3B to the opening direction while the timer Ra counts the time.

Further, the demagnetization pulse applying means D includes power supply monitoring means Da for monitoring power to be supplied to the motor 15 using the operation input signal of the buttons 17A, and a timer Db for counting a pulse width (a second predetermined time) matching with the characteristic of the motor 15 using an edge at the completion of the power supply captured by the power supply monitoring means Da as a trigger, and inputs an output from the timer Db into the reverse rotation section Rb so as to generate a demagnetization signal Sd. The demagnetization pulse applying means D that includes the power supply monitoring means Da and the timer Db can be formed very simply by a digital circuit such as an edge detecting circuit or an analog circuit such as a one-shot circuit. In addition, the second predetermined time is set to a time such that even if power is supplied from the reverse rotation section Rb to the motor 15, the opening/closing section 3 does not move.

The direction/position detecting section 20 includes a direction determination section 20A for determining a rotating direction d of the motor 15, and a current position detecting section 20B for detecting a current position L of the opening/closing section 3B. The current position detecting section 20B includes a nonvolatile memory Mem for backing up the current position L. The relative acceleration calculating section 24 includes a counter 24A for counting the reference pulse Pm per cycle of the pulse Pa so as to obtain an inverse (1/vt) of the relative speed Vt, moving average arithmetic units 24B and 24C for calculating moving average with time difference Δt, and a subtracting section 24D for obtaining the relative acceleration a. That is to say, the reference pulse Pm is outputted by using measured values of the power supply voltage Vb through the VCO 23, and the pinch of a foreign object is determined by using the relative acceleration obtained from displacement of the window 3B using a relative time indicated by one cycle of the reference pulse Pm as a yardstick, so that an influence of the drop in the power supply voltage Vb is not given.

Figure 5:
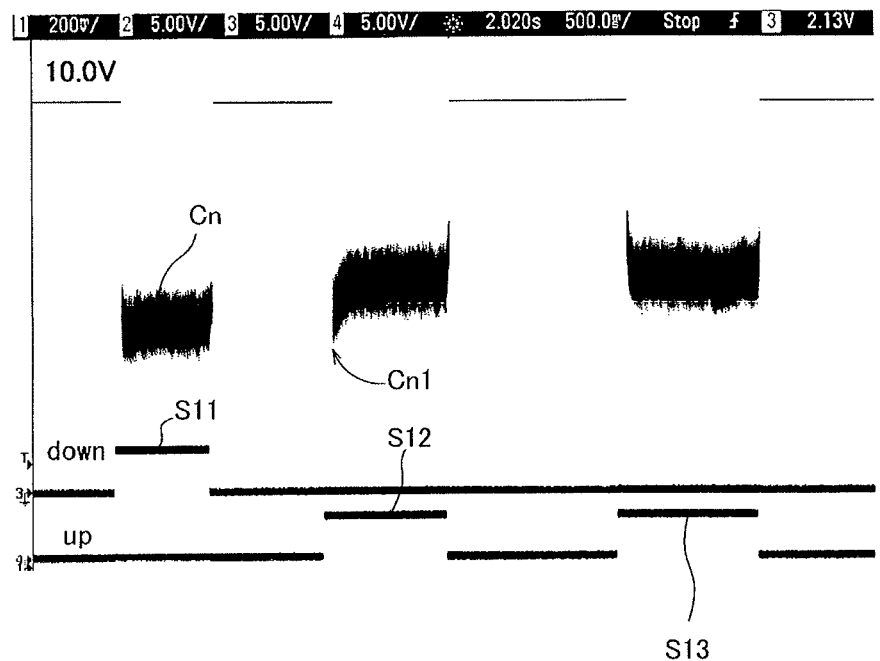
FIG. 5 is a diagram illustrating an example of a comparison with an operation in the control device at the opening/closing section of the vehicle.
Figure 6:
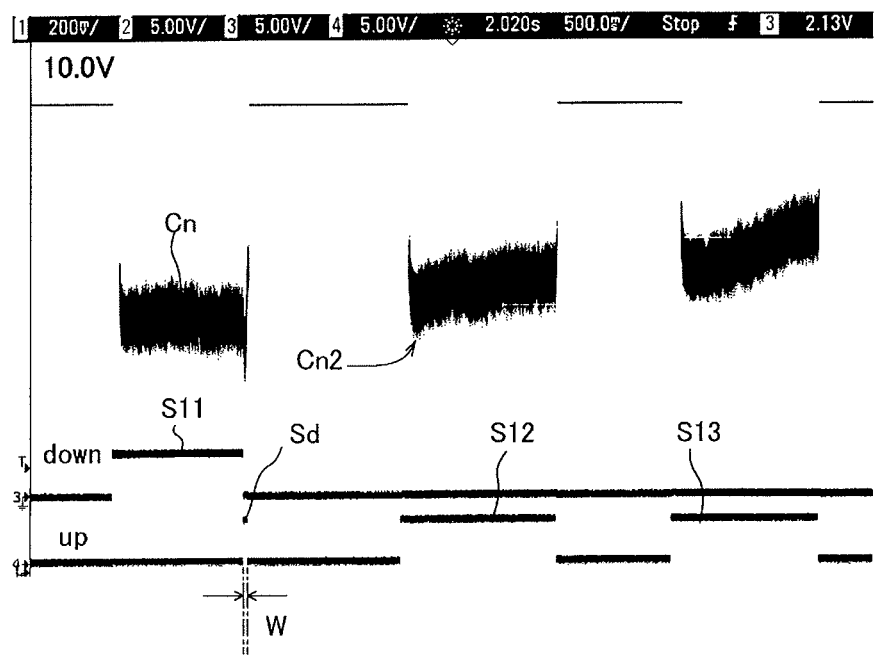
FIG. 6 is a diagram describing the operation of the control device at the opening/closing section of the vehicle.

FIG. 5 is a diagram illustrating a waveform obtained by actually measuring a change in the rotating speed of the motor 15 in the case where the demagnetization pulse is not applied, and FIG. 6 is a diagram illustrating a comparison of speed changes in the case where power whose polarity closes the window 3B at the completion time of the driving of the opening/closing section (window) 3B to the opening direction is applied as the demagnetization pulse Pd. In FIG. 5 and FIG. 6, a symbol Cn indicates a count value counted by the counter 24A, and represents the inverse (1/Vt) of the relative speed Vt. Symbols S11, S12 . . . indicate examples of operation signals for applying power to the motor 15 in order to move the window up and down.

In embodiments below, since the opening/closing section 3 is the window 3B, a pinch determination is made only when the window 3B is closed (moved up). Therefore, the demagnetization pulse applying means D supplies power with reverse polarity (closing direction) to the motor in a pulse-like manner only at the completion time of the driving of the window 3B to the opening direction. However, when the opening/closing section 3 is not the window 3B, the pinch determination should be made both in the opening direction and the closing direction of the opening/closing section 3. In this case, as a matter of course, power with reverse polarity should be applied to the demagnetization pulse Pd at the completion time of the opening/closing by the motor in both the closing direction and the opening direction of the opening/closing section 3.

As shown in FIG. 5, when the demagnetization pulse Pd is not applied and the user operates the buttons 17A and the like and a drop operation signal S11 is outputted to the driver 16B, power for driving the window 3B to the opening direction is supplied to the motor 15 by the driver 16B. When the window 3B moves down and reaches the lower end portion, the moving of the window 3B is stopped at a lower end, but a large electric current flows in the motor 15 and magnetization occurs in the rotor in the motor 15.

When magnetization occurs in the rotor, a force whose direction is opposite to a last moving direction is always applied to the motor 15, and, as indicated by the operation signal S12, when power with reverse polarity is supplied next time, as indicated by a count value Cn1, the motor 15 may abruptly rotate, and the rotating speed may be high for just a moment. (Note that since the count value Cn is the inverse of the relative speed Vt of the window 3B, the higher the relative speed Vt is, the smaller the count value Cn.)

The motor 15 whose relative speed Vt is high for just a moment returns to a normal rotating speed soon, but since a speed change during this time is remarkable, a false operation such that this is determined as a pinch by the pinch determination device J is considered to occur. Further, the occurrence of magnetization in the rotor changes by the characteristic of the motor 15. As indicated by an operation signal S13, when power with uniform polarity are successively supplied to the motor 15, the motor 15 does not abruptly rotate at its next starting.

As shown in FIG. 6, in the control device 1 at the opening/closing section of the vehicle of the present embodiment, when the moving down operation signal S11 is outputted to the driver 16B of the motor 15, the demagnetization signal Sd with short pulse width that does not allow the window 3B to move is applied to the driver 16B so that the demagnetization pulse Pd with power of a polarity for closing the window 3B is generated at the completion of the moving down operation (the opening direction).

At this time, the magnetized rotor in the motor 15 is demagnetized by the demagnetization pulse Pd. Therefore, as indicated by the operation signal S12 next, even when a power with reverse polarity is supplied to the motor 15, the motor 15 does not abruptly rotate as indicated by the count value Cn2, and thus the pinch determination device does not perform a false operation.

A width W of the demagnetization pulse Pd is adjusted to a short pulse width W so that the rotor can be demagnetized according to the motor 15 and the window 3 does not move. That is to say, the demagnetization pulse applying means D is provided on the side of the motor 15, and preferably adjusts the pulse width W according to the characteristic of the motor 15, so that the pinch determination device J can make more precise pinch determinations without being influenced by magnetization of the motor 15.

In the above embodiment, the demagnetization pulse applying means D is formed in the processing section 16A, but the present invention is not limited to the demagnetization pulse applying means D being inside of the processing section 16A of the ECU 16, and for example, the demagnetization pulse applying means D may be arranged just proximally to the motor 15.

Figure 7:
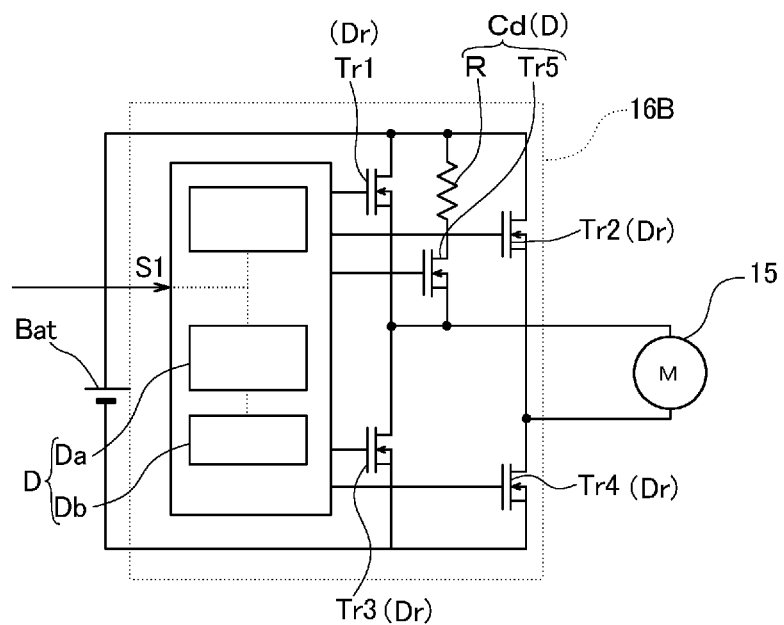
FIG. 7 is a diagram illustrating a modified example of the control device at the opening/closing section of the vehicle.

FIG. 7 illustrates a modified example where the demagnetization pulse applying means D is provided in the driver 16B for supplying power to the motor 15. In FIG. 7, Tr1 to Tr4 are transistors that constitute a bridge for supplying power of regular/reverse directions to the motor 15, and Dr is a drive circuit for outputting signals for turning on transistors Tr1 and Tr4 or Tr2 and Tr3 according to the opening/closing signal S1.

The demagnetization pulse applying means D provided in the driver 16B includes the power supply monitoring means Da for monitoring power to be supplied to the motor 15 using the opening/closing signal S1, the timer Db for measuring a pulse width matching with the characteristic of the motor 15 using an edge at the completion of the power supply to the opening direction captured by the power supply monitoring means Da as a trigger, and a demagnetization pulse applying circuit Cd formed in the bridge circuit formed by the transistors Tr1 to Tr4 of the driver 16B. More concretely, the power supply monitoring means Da and the timer Db constituting the demagnetization pulse applying means D is a one-shot circuit (may be an edge detecting circuit).

The demagnetization pulse applying circuit Cd is a very simple circuit where a resistive element R and a transistor Tr5 are connected in series, and is connected to the transistor Tr1 in parallel. The demagnetization pulse applying circuit Cd turns on the transistor Tr5 during the time of measurement of the timer Db, and simultaneously turns on the transistor Tr4, so as to be capable of applying the demagnetization pulse Pd. Since the resistive element R is connected to the transistor Tr5 in series, the power to be supplied to the motor 15 via the demagnetization pulse applying circuit Cd can be repressed low, so that the rotor in the motor 15 can be demagnetized and the power can be repressed so that the motor 15 does not rotationally move to the opposite direction.

Further, since the present embodiment illustrates an example where the opening/closing section 3 is the window 3B, the demagnetization pulse applying circuit Cd is formed only in the transistor Tr1 (or Tr4) on a side where power with the polarity for moving the window 3B to the closing direction is applied to the motor 15, but when the opening/closing section 3 is a roof, the demagnetization pulse applying circuit Cd is formed also in the transistor Tr2 (or Tr3) on aside where power with the polarity for moving the window 3B to the opening direction is supplied to the motor 15.

The power supply monitoring means Da and the timer Db may monitor power to be fed to the motor 15 based on a voltage or an electric current so as to detect the completion time of the opening/closing. In this case, since the demagnetization pulse applying means D can be further formed just proximally to the motor 15 individually, demagnetization can be carried out according to the characteristics of the rotors 15.

The demagnetization pulse applying means D is formed by hardware, but the present invention is not limited to this point. That is to say, the demagnetization pulse applying means D may be formed by software of a demagnetizing process executable in the arithmetic processing unit in the ECU 16. In this case, since the power supply monitoring means Da and the timer Db can be implemented by a program (a simple process of a subroutine) executed by the arithmetic processing unit in the ECU 16, the manufacturing cost is not increased and a load is not put on the process of the arithmetic processing unit.

Figure 8:
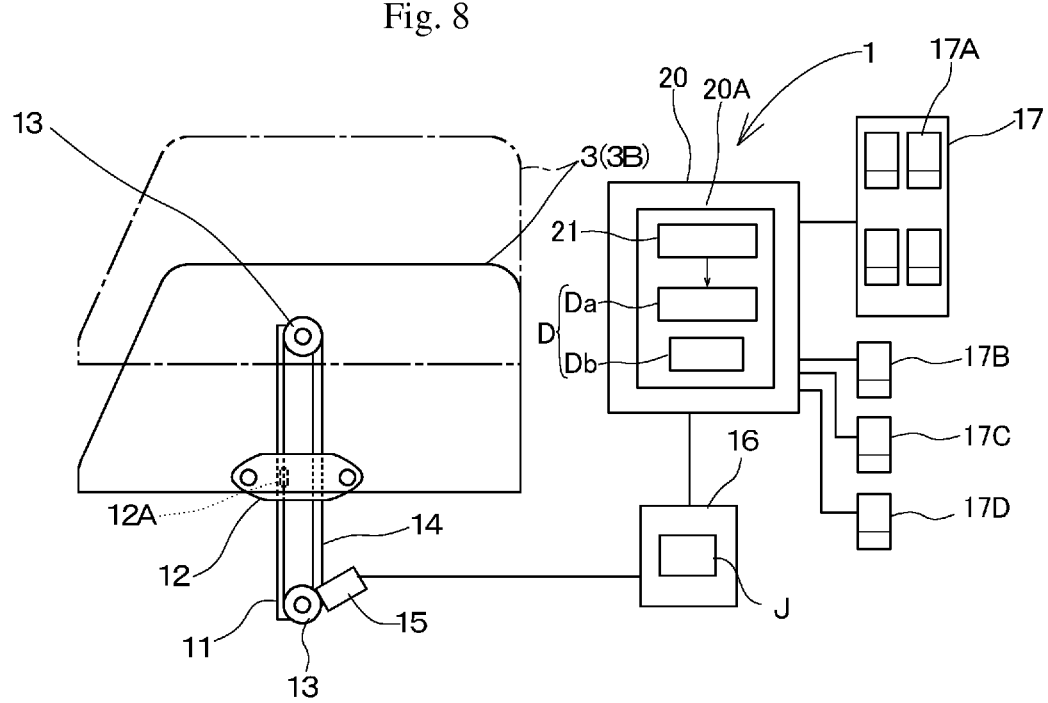
FIG. 8 is a diagram illustrating another modified example of the control device at the opening/closing section of the vehicle.
Figure 9:
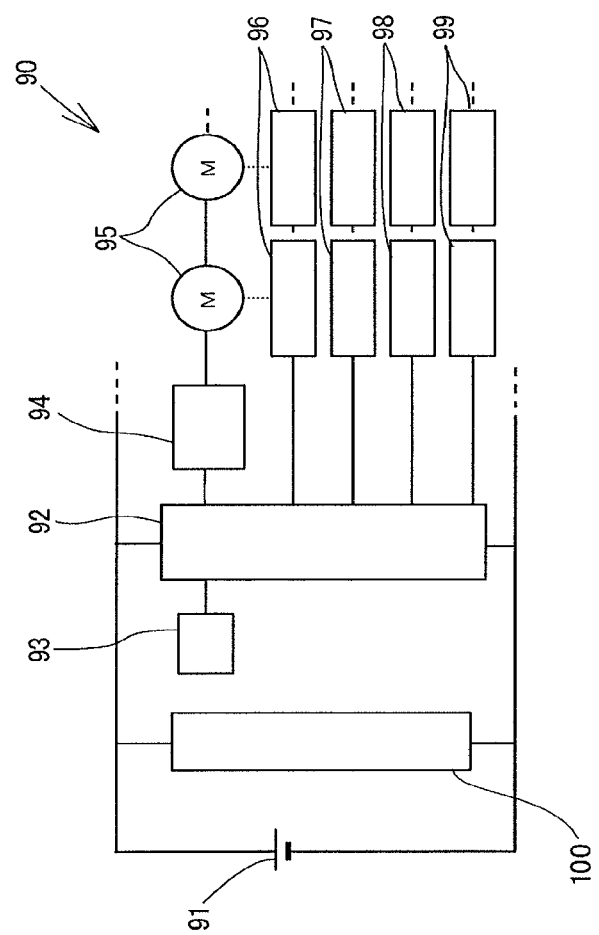
FIG. 9 is a diagram describing a constitution of a conventional electric window device.

FIG. 8 is a diagram illustrating another modified example, 20 is an overall ECU for performing an upper arithmetic process for collectively inputting operations of a plurality of operation switches 17A to 17D provided to the respective doors so as to control the opening/closing operation of the opening/closing section 3 in an integrated manner, 20A is an arithmetic processing unit in the ECU 20, and 21 is an opening/closing section integrated control program executable by the arithmetic processing unit 20A. In this modified example, the power supply monitoring means Da and the timer Db are programs (software) executed by the arithmetic processing unit 20A, and operate so that power with reverse polarity is supplied to the motor 15 in a pulse-like manner only for a predetermined time described in detail already at the completion of the opening/closing of the opening/closing section 3 (in the case of the window 3B, driving only to the opening direction) according to the operation of the opening/closing section integrated control program 21.

When the demagnetization pulse applying means D is implemented by the software executable by the arithmetic processing section 20A on the side of the integrated ECU 20, the demagnetization pulse applying means D does not have to be provided to the ECUs 16 arranged near the opening/closing sections 3, respectively, and thus the manufacturing cost can be reduced. Further, also in this case, since the demagnetization pulse applying means D can be implemented by a simple program, a load is not put on the arithmetic processing unit 20A and the manufacturing cost does not increase.

The above embodiments illustrate the example where the power supply monitoring means Da operates using the operation input signals from the buttons 17A to 17D for opening/closing the opening/closing section 3 or the opening/closing signal S1 for opening/closing the motor 15, but the power supply monitoring means Da may monitor the motor current Im measured by the current measuring section 22 provided near the motor 15.

Most of all, when the power supply monitoring means D is implemented by software, the power supply monitoring means Da includes magnetic susceptibility estimating means for monitoring a level and a flowing time of the motor current Im so as to estimate a state of magnetization to occur in the rotor, and the timer Db may include demagnetization pulse width adjusting means for adjusting the width of the demagnetization pulse according to magnetic susceptibility. Also in the case where the demagnetization pulse applying means D is formed by hardware, it goes without saying that the measurement time of the timer Db is variable and can be adjusted according to the magnetic susceptibility of the rotor.

Further, separately from the driver 16B for rotating the motor 15, a driver circuit for applying the demagnetization pulse Pd is considered to be formed so as to apply the demagnetization pulse Pd of a voltage lower than that at the time of rotating the motor 15 to the motor 15.

INDUSTRIAL APPLICABILITY

According to the present invention, when the rotor of the motor for opening/closing the opening/closing section is magnetized, it can be demagnetized, and thus abrupt operation is not performed at the time of reverse rotation of the opening/closing section. That is to say, the pinch detecting device for making a pinch determination based on the change in the rotating speed of the motor does not falsely operate, so as to obtain a stable operation and be capable of securely detecting a pinch of a foreign object, and thus this is used for opening/closing sections such as windows, slide doors and doors of trunk rooms of vehicles.

DESCRIPTION OF SYMBOLS

1: control device at opening/closing section of vehicle
2: vehicle
3: opening/closing section
3A: slide door
3B: window
3C: roof window
15: motor
D: demagnetization pulse applying means
J: pinch determination device
Pd: demagnetization pulse

The invention claimed is:

1. A method for controlling an opening and closing section of a vehicle, the method comprising:
supplying a power to a motor to move the opening and closing section of the vehicle, the motor performing an opening operation of moving the opening and closing section in an opening direction when the power has a first polarity and the motor performing a closing operation of moving the opening and closing section in a closing direction when the power has a second polarity that is opposite to the first polarity;
monitoring for a change in a rotation number of the motor during the opening and closing operations to determine if a foreign object is being pinched by the opening and closing section;
when the opening operation is completed, supplying a power having the second polarity to the motor in a pulsed manner; and
when the closing operation is completed, supplying a power having the first polarity to the motor in a pulsed manner.

2. The method according to claim 1, further comprising:
when the monitoring determines that a foreign object is being pinched during the opening operation, supplying a power having the second polarity to the motor to perform the closing operation; and
when the monitoring determines that a foreign object is being pinched during the closing operation, supplying a power having the first polarity to the motor to perform the opening operation.

3. The method according to claim 2, wherein
when the monitoring determines that the foreign object is being pinched during the opening operation, the supplying comprises supplying the power having the second polarity to the motor for a first predetermined amount of time;
when the monitoring determines that the foreign object is being pinched during the closing operation, the supplying comprises supplying the power having the first polarity to the motor for the first predetermined amount of time;
when the opening operation is completed, the supplying comprises supplying the power having the second polarity to the motor in the pulsed manner for a second predetermined amount of time; and
when the closing operation is completed, the supplying comprises supplying the power having the first polarity to the motor in the pulsed manner for the second predetermined amount of time.

4. The method according to claim 3, wherein
when the opening operation is completed, the supplying further comprises supplying the power having the second polarity at a level such that the motor does not perform the closing operation; and
when the closing operation is completed, the supplying further comprises supplying the power having the first polarity at a level such that the motor does not perform the opening operation.

5. The method according to claim 1, wherein
every time the opening operation is completed, the supplying comprises supplying the power having the second polarity to the motor in the pulsed manner; and
every time the closing operation is completed, the supplying comprises supplying the power having the first polarity to the motor in the pulsed manner.

6. A method for controlling a window of a vehicle, the method comprising:
supplying a power to a motor to move the window of the vehicle, the motor performing an opening operation of moving the window in an opening direction when the power has a first polarity and the motor performing a closing operation of moving the window in a closing direction when the power has a second polarity that is opposite to the first polarity;
monitoring for a change in a rotation number of the motor during the closing operation to determine if a foreign object is being pinched by the window; and
when the opening operation is completed, supplying a power having the second polarity to the motor with a pulse width such that the motor does not perform the closing operation.

7. The method according to claim 6, wherein
every time the opening operation is completed, the supplying comprises supplying the power having the second polarity to the motor with the pulse width such that the motor does not perform the closing operation.

* * * * *